United States Patent [19]

Johnson

[11] 4,218,642
[45] Aug. 19, 1980

[54] STEPPER MOTOR RATE CONTROL

[75] Inventor: Gilbert A. Johnson, Mequon, Wis.

[73] Assignee: Marquette Electronics, Inc., Milwaukee, Wis.

[21] Appl. No.: 932,341

[22] Filed: Aug. 9, 1978

[51] Int. Cl.² .............................................. G05B 19/40
[52] U.S. Cl. .................................................. 318/696
[58] Field of Search ......................... 318/696, 685, 138

[56] References Cited

U.S. PATENT DOCUMENTS

| 3,560,821 | 2/1971 | Beling | 318/138 |
|---|---|---|---|
| 3,662,245 | 5/1972 | Newell | 318/696 |
| 3,746,959 | 7/1973 | Kobayashi et al. | 318/696 |
| 3,963,946 | 6/1976 | Zajac | 318/696 X |
| 4,142,140 | 2/1979 | Wiesner | 318/696 |

Primary Examiner—B. Dobeck
Attorney, Agent, or Firm—Andrus, Sceales, Starke & Sawall

[57] ABSTRACT

A stepping motor rate control employs a predetermined energization of one quantity to step the motor and a lower, predetermined quantity of current energization to hold the motor in position as by using a current pulse to hold the motor. The frequency of energization of the motor is constant; the speed of the motor being determined by the ratio of stepping pulses to holding pulses.

The stepping motor rate control is driven from a clock. A duty cycle divider reduces the clock frequency down to the energizing frequency of the stepping motor. An energizing pulse is applied to the motor during each cycle. A divide-by-N-divider, coupled to the duty cycle divider, is used to determine the ratio of stepping energization pulses to holding energization pulses to be provided to the motor and hence the speed of the motor. The divide-by-N-divider operates a duty cycle control connected to the duty cycle divider which controls the width of the output pulses of the duty cycle divider and establishes the stepping pulse-holding pulse ratio in the output of the duty cycle divider. The control includes output circuitry which sequentially energizes the motor windings with the stepping pulses and repetitiously energizes the windings with the holding pulses.

In a modification of the rate control, the operation of the control may be established by an external signal to coordinate the operation of the stepping motor with other apparatus.

9 Claims, 21 Drawing Figures

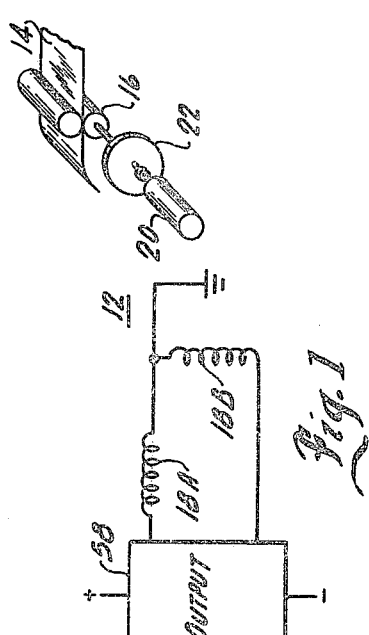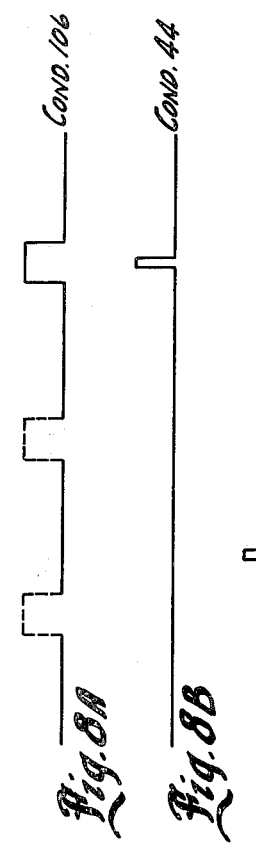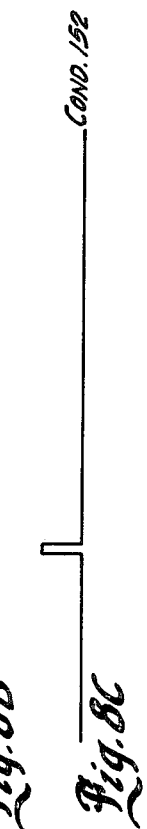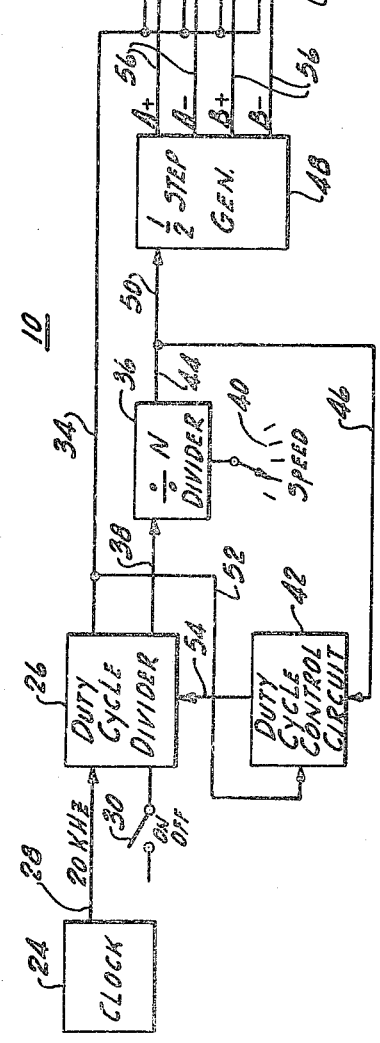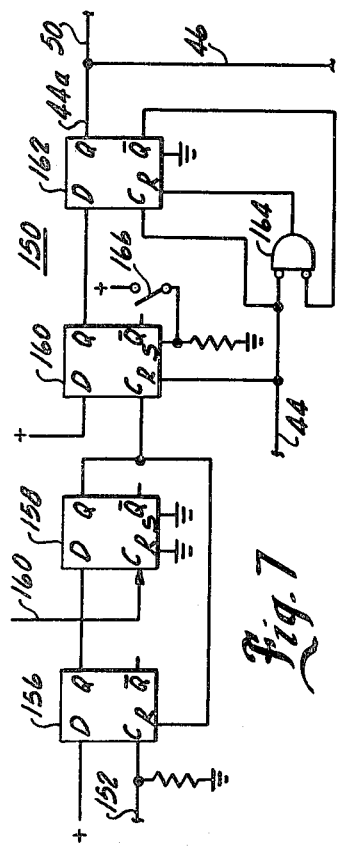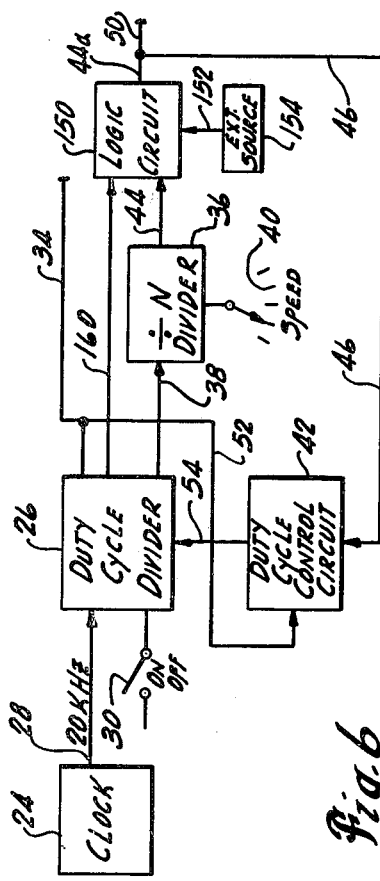

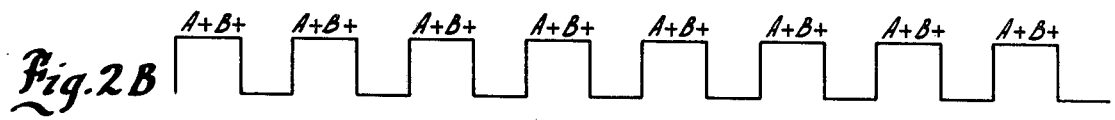
Fig.2A
Fig.2B
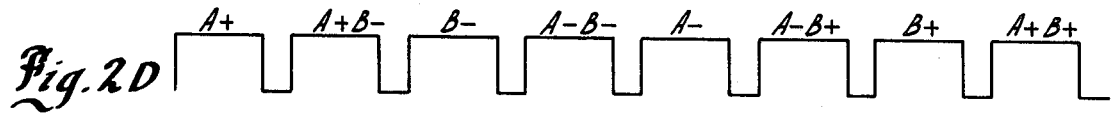
Fig.2C
Fig.2D
Fig.2E
Fig.2F
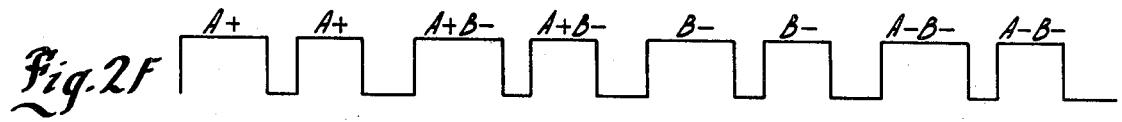
Fig.2G
Fig.2H
Fig.2I
Fig.2J

STEPPER MOTOR RATE CONTROL

BACKGROUND OF THE INVENTION—FIELD OF THE INVENTION

The present invention relates to a rate drive control suitable for use with a stepper motor.

BACKGROUND OF THE INVENTION—DESCRIPTION OF THE PRIOR ART

A stepper motor has a stator including a plurality of poles wound with phase windings. Typically, two phase windings are utilized. In a variable reluctance stepper motor the rotor consists of a cylindrical, toothed member; in a permanent magnet motor, the rotor consists of a plurality of permanent magnets. Sequential energization of selected phase windings results in increments or "steps" or rotation in the rotor from one position to another.

The magnitude of the steps of the rotor is precisely defined by the electro-mechanical construction of the motor, permitting accurate control of motor speed by the timing of the sequential energization of the phase windings.

Because the motor is moved rapidly to the new position, it is preferable to follow the stepping energization with a reenergization of the selected phase winding which urges the motor to remain in the new position. This reenergization, termed "holding" energization, damps out undesirable resonances and oscillations caused by the sudden starting and stopping of the stepped motor.

It is desirable to provide a rapid buildup of energizing current in the windings to enhance the operation of the motor. However, this rapid buildup is impeded by the time constant resulting from the inductive and resistive properties of the windings. The desired rapidity of the buildup of current may be provided by increasing the voltage applied to the stator windings over the nominal voltage specified for the motor. Since the increased voltage increases steady state current, the problem then becomes one of limiting the latter quantity.

A variety of techniques are directed to providing this current limitation. In a simple approach, sufficient additional resistance is inserted in series with the windings to provide the necessary current limitation. Because large amounts of power are dissipated across the resistors during energization, heat and inefficient operation results.

Other approaches actually sense and feedback winding current magnitude to alter the energization of the winding in a manner to limit the current. In one such technique, a "chopped" wave form is generated. An increased voltage is applied to the windings at the beginning of the energization to allow current to rapidly build up. Once the current reaches the desired level, the voltage is pulse width modulated during the remainder of the energization to hold winding current at the desired value. The modulation is carried out responsive to the current feedback.

In another technique, a voltage supply having two voltage levels is utilized. A high voltage is applied during pulse initiation. When the motor current reaches the desired level, the voltage is reduced to the lower level which is suitable for maintaining current at the steady state value. Yet another approach utilizes a constant current source which delivers the voltage required to maintain current constant. See U.S. Pat. No. 3,560,821.

While the latter techniques tend to be more efficient than simple resistive current limiting, their use may be limited by instabilities and resonances attendant the various feedback and control loops.

SUMMARY OF THE PRESENT INVENTION

The present invention is directed to a stepping motor rate control which is capable of highly efficient and simple operation.

To these ends, the present invention employs a predetermined quantity of current energization and a lower predetermined quantity of current energization to hold the motor in position. This may be accomplished by using a current pulse of one width to step the motor and a narrower current pulse to hold the motor. The preselected pulse widths for the stepping and holding pulses are established by the control circuitry itself without use of any current feedback from the motor windings. The frequency of energization of the motor is constant; the speed of the motor being determined by the ratio of stepping pulses to holding pulses. The constant frequency of energization and absence of any winding current feedback simplify the construction of the control.

The width of the greater energizing pulse is selected so that the current will achieve desired levels during application of this pulse. Since the power handling elements of the control are operated in an on-off switching mode, power dissipation in the control is low.

The stepping motor rate control of the present invention is driven from a clock. A duty cycle divider reduces the clock frequency down to an energizing frequency with the proper duty cycle to establish current in the stepping motor. An energizing pulse is applied to the motor in each period of the energizing frequency. A divide-by-N-divider, coupled to the duty cycle divider, is used to determine the ratio of stepping energization pulses to holding energization pulses to be provided to the motor and hence the speed of the motor. The divide-by-N-divider operates a duty cycle control connected to the duty cycle divider which controls the width of the output pulses of the duty cycle divider, and establishes the stepping pulse-holding pulse ratio in the output of the duty cycle divider.

The divider-by-N-divider is also connected to the input of a step generator for the motor. The output of the step generator and the output of the duty cycle divider are connected to logic circuitry coupled to the motor. Each time an output signal appears from the divide-by-N-divider, the duty cycle control operates the duty cycle divider to provide a pulse of stepping width. The step generator is energized to establish an output signal condition suitable for sequentically stepping the energization of the motor. The presence of signals from the step generator and the duty cycle divider at the logic circuitry causes the control to provide energization corresponding to the stepping pulses to selected windings of the motor in the sequentially advanced manner to step the motor. In the absence of any output from the divide-by-N-divider, the duty cycle control causes the duty cycle divider to produce pulses of holding width which are employed by the logic circuitry to energize previously energized windings as holding energization.

The circuitry of the rate control may be formed from digital signal components.

In a modification of the rate control, the operation of the control may be established by an external signal to coordinate the operation of the stepping motor with other apparatus.

BRIEF DESCRIPTION OF THE DRAWING

FIG. 1 is a schematic diagram of the improved rate control of the present invention.

FIGS. 2A through 2J are graphs showing the operation of the rate control of FIG. 1.

FIG. 6 is a schematic diagram of a modified rate control circuit of the present invention suitable for operation by an external triggering source.

FIG. 7 is a schematic diagram of logic circuitry found in the rate control of FIG. 6.

FIGS. 8A through 8E are graphs showing the operation of the circuitry of FIGS. 6 and 7.

DETAILED DESCRIPTION OF THE PREFERRED EMBODIMENT

Figure 3:
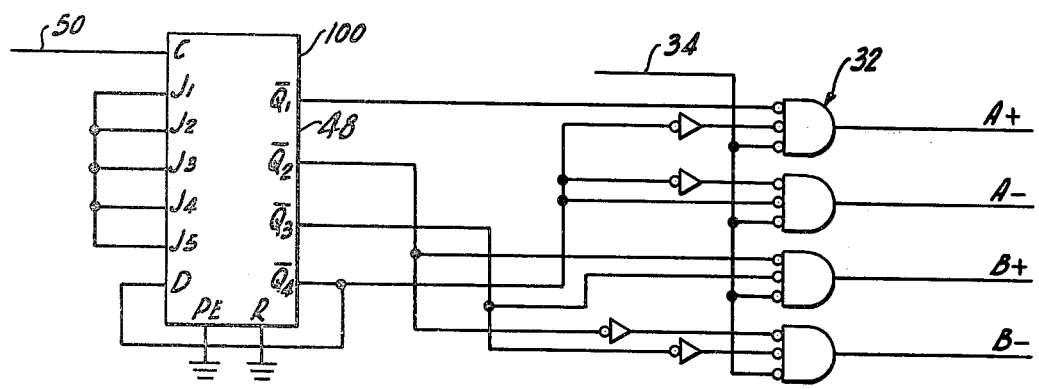
FIG. 3 is a schematic diagram of circuitry which may be used to form the step generator and the logic used to gate the duty cycle pulse into the motor.

One embodiment of the control of the present invention is shown in FIG. 1 by the numeral 10. Control 10 is shown operating stepper motor 12 which drives a recording chart 14 by means of a capstan drive 16. In a typical drive of this type, each stepping energization moves the rotor 1.8° resulting in 0.1 mm movement of chart 14.

Stepper motor 12 has a pair of phase windings 18A and 18B wound in a plurality of poles. Capstan drive 16 is connected to rotor 20 of stepper motor 12 through a flexible coupling and flywheel 22 which smooths the incremental movement of rotor 20.

The sequential energization of windings 18A and 18B may proceed either on a full-step basis or a half-step basis. The sequence of energization is outlined below in which one direction of current energization is indicated by a + sign and the opposite direction of current energization is indicated by a − sign.

| Full-Step Energization | | Half-Step Energization | |
|---|---|---|---|
| 18A | 18B | 18A | 18B |
| 1. A+ | B+ | 1. A+ | B+ |
| 2. A− | B+ | 2. A+ | |
| 3. A− | B− | 3. A+ | B− |
| 4. A+ | B− | 4. | B− |
| | | 5. A− | B− |
| 1. A+ | B+ | 6. A− | |
| | | 7. A− | B+ |
| | | 8. | B+ |
| | | 1. A+ | B+ |

While half-step energization of the motor is shown and described herein, the invention is equally suitable for full-step energization of stepping motor 12.

Control 10 is driven by clock generator 24. The output frequency of clock generator 24 is selected in consideration of the maximum frequency with which motor 12 is to be energized and the fineness with which it is desired to vary the width of the pulses applied to motor 12, as hereinafter described. For example, the clock frequency may be 20 KHz and motor 12 may be pulsed at a frequency of 1 KHz. Each period during which the motor may be energized occupies the same interval as twenty clock pulses. The width of the motor energization pulse may be varied in increments of one clock pulse from one to twenty clock pulses, or in 5% increments. The higher the frequency of the clock, the greater the fineness of the variation.

Clock 24 is connected to duty cycle divider 26 by conductor 28 which contains the 20 KHz output signal. Duty cycle divider 26 may be a digital divider. Duty cycle divider 26 divides the 20 KHz frequency of clock generator 24 down to a frequency of 1 KHz for application to motor 12. The motor will thus be pulsed at a frequency of 1 KHz and have an energization period or interval of 1000 microseconds. An on-off switch 30 may also be connected to duty cycle divider 26 to remove excitation from the motor.

Duty cycle divider 26 is connected to a plurality of AND gates 32 by conductor 34 for use in controlling the provision of pulses to motor 12 in a manner hereinafter described. Duty cycle divider 26 is also connected to the input of divide-by-N-divider 36 by conductor 38. Divide-by-N-divider 36 may also be a digital divider. Divide-by-N-divider 36 provides an output indicative of the ratio of stepping pulses to holding pulses desired in the output of duty cycle divider 26 and hence the speed of motor 12. As its name implies, the operation of the divide-by-N-divider 36 may be seen as a dividing action with respect to the output of duty cycle divider 24. If full speed of motor 12 is desired, the operation of divide-by-N-divider 36 is to divide by 1 so that every output pulse of duty cycle divider 26 will be a stepping pulse. If half-speed is desired in motor 12, divide-by-N-divider 36 divides by 2 so that every other pulse is a stepping pulse and the intermediate pulses are holding pulses. For a motor speed of 80% of full speed, the action of divide-by-N-divider 36 is to divide by 1.25 so that four stepping pulses followed by one holding pulse appear in the output of duty cycle divider 26. The dividing action of divide-by-N-divider 36 may be controlled by multiple position switch 40, a variable frequency generator, a potentiometer, or other input device.

The output of divide-by-N-divider may be a series of pulses, one of which appears whenever a stepping pulse is desired in the output of duty cycle divider 26. The output of divide-by-N-divider 36 is provided to duty cycle control circuit 42 in conductors 44 and 46 to half-step generator 48 by conductors 44 and 50.

Duty cycle control circuit 42 is connected to duty cycle divider 26 by conductor 52 and determines whether a stepping pulse or a holding pulse will appear in any particular energization cycle of motor 12. This is accomplished by commanding duty cycle divider 26 via line 54 to generate a stepping width pulse when a signal is received on conductors 44 and 46. In the absence of a signal in conductors 44 and 46 to duty cycle control circuit 42, duty cycle divider 26 generates a holding width pulse.

As noted, supra, the magnitude of the pulses is selected such that pulses of greater width are applied to step motor 12 than to hold to motor 12 in the newly stepped position. For example, a pulse width of 75% of the duty cycle may be used for stepping the motor to a new position and a pulse width of 55% of the cycle is used for holding the motor in an existing position. For the 1 KHz, 1000 microseconds period described above, the stepping energization would be 750 microseconds in duration and the holding energization would be 550 microseconds in duration. Other duty cycle portion combinations may also be used, for example, 80%–60% duty cycle depending on the characteristics of the motor and the torque required, etc.

Duty cycle divider 26 may provide the desired pulse width by a counting function. It will be appreciated that due to the action of duty cycle divider 26 there will be twenty input pulses from the 20 KHz output of clock generator 24 for every cycle at the 1 KHz frequency of the output of duty cycle divider 26. To provide a 75% duty cycle stepping pulse, a signal is provided in conductor 34 while fifteen out of twenty input clock pulses are being received by duty cycle divider 26. To provide a 55% duty cycle pulse a signal is provided in conductor 34 while eleven out of the twenty clock pulses are being received by duty cycle divider 26.

The action of duty cycle control 42 may be seen as analogous to that of a flip flop driven by the application of a signal from duty cycle divider 26 and a signal from divide-by-N-divider 36. Each time a pulse appears in conductors 34 and 52 from duty cycle divider 26, duty cycle control 42 is driven to the 55% duty cycle condition by the signal provided in conductor 52. Whenever a pulse appears at the output of divide-by-N-divider 36, duty cycle control 42 is reset to the 75% duty cycle condition by the output signal of divide-by-N-divider 36 provided in conductors 44 and 46 overriding the pulse in conductor 52. The output of duty cycle control 42 is provided to duty cycle divider 26 in conductor 54.

Half-step generator 48 is operated in the manner of a ring counter. The input of half-step generator 48 is connected to divide-by-N-divider 36 by conductors 44 and 50. Half-step generator 48 has four outputs 56, corresponding to the various energizations set forth in tabular form, supra. Each time an input pulse is provided in conductor 50, half-step generator 48 is triggered to advance the energization of the outputs by one of the half-steps. For example, an input pulse may operate half-step generator 48 to change the energization of the A+, B+ outputs 56 listed as the first half-step in the energization table to the A+ output only, listed as the second half-step. The next pulse in conductor 50 removes the previous energization and advances the energization to the A+, B− outputs and so on. Half-step generator 48 thus generates the half-steps. The endless, repetitious action of half-step generator 48 is likened unto the endlessness of a ring or annulus.

Outputs 56 of half-step generator 48 are provided as one input to AND gates 32. The other input to AND gates 32 is conductor 34 containing the output of duty cycle divider 26. The output of AND gates 32 is connected to output circuitry 58 which provides the amplification necessary to energize windings 18A and 18B.

The operation of control 10 is as follows. Clock 24 provides the 20 KHz output signal shown in FIG. 2A to duty cycle divider 26 in conductor 28. Duty cycle divider 26 divides the 20 KHz input signal to provide a 1 KHz frequency duty cycle signal. In the absence of any output signal from divide-by-N-divider 36 in conductors 44 and 46 to duty cycle control 42, duty cycle control 42 provides a signal to duty cycle divider 26, responsive to the signal in conductor 52 which operates the divider 26 to the 55% duty cycle condition so that the output signal of duty cycle divider 25 in conductor 34 is the 1 KHz 55% duty cycle signal shown in FIG. 2B.

Some combination of outputs 56 will be energized by half-step generator 48, for example, A+, B+, and will be providing inputs to AND gates 32. The pulses in conductor 34 will be provided to the inputs of all AND gates 32. However, only at the A+ and B+ AND gates will the two coincidental signals be applied which are necessary to provide an output. The A+ and B+ AND gates 32 will thus provide outputs to output circuit 58 to provide the A+, B+ energization to windings 18A and 18B.

Each time a pulse appears in conductor 34, it will be repetitively applied in the same A+, B+ energization combination as a holding pulse to hold rotor 20 in its existing position without rotation. The A+, B+ notation has been entered on FIG. 2B.

In order to drive motor 12 full speed, divide-by-N-divider 36 is set to divide by 1. This means that an output pulse from divide-by-N-divider 36 will appear in conductors 44 and 46 in each energization cycle of motor 12, as shown in FIG. 2C. The number of output pulses from divide-by-N-divider 36 in conductor 44 will equal the number of input pulses in conductor 38.

The pulses in conductors 44 and 46 control duty cycle control 42 to operate duty cycle divider 26 so that the output pulses of the duty cycle divider 26 in conductor 34 occupy 75% of each duty cycle, as shown in FIG. 2D.

The pulses appearing in conductors 44 and 50 to half-step generator 48 from divide-by-N-divider 36 operate the generator to sequentially energize outputs 56 and supply input signals to AND gates 32 in the sequence of the table, supra. The pulses in conductor 34 are also provided to AND gates 32. AND gates 32 are sequentially operated by the coincidental application of the outputs of half-step generator 48 and the signal in conductor 34 to operate output circuit 58 and sequentially energize windings 18A and 18B in the sequence shown in FIG. 2D.

To drive motor 12 at half-speed, divide-by-N-divider 36 is adjusted so that a pulse is provided in conductors 44, 46 and 50 for every other output pulse of duty cycle divider 26, as shown in FIG. 2E. Divide-by-N-divider 36, divides by two. When a pulse is provided in conductors 44 and 46 from divide-by-N-divider 36, duty cycle control 42 operates duty cycle divider 26 to provide a 75% pulse. The signal from divide-by-N-divider 36 in conductors 44 and 50 operates half-step generator 48 to sequentially advance the energization of its outputs 56 to AND gates 32. This energization, plus the 75% stepping pulse in conductor 34 operates the AND gates to provide stepping energization to motor 12.

When no pulse is provided in conductors 44 and 46 due to the dividing action of divide-by-N-divider 36, the signal in conductor 52 operates duty cycle control 42 and duty cycle divider 26 to provide a 55% pulse. In the absence of any signal in conductors 44 and 50 to half step generator 48, the 55% pulse in conductor 34 operates AND gates 32 to reenergize the previously energized windings so that the 55% pulse becomes a holding pulse. The operation of control 10 for 50% speed is shown in FIG. 2F.

In a similar manner, FIGS. 2G and 2H show the operation of control 10 to drive motor 12 at a speed greater than the half-speed operation shown in FIG. 2F. The operation is such that three stepping pulses are provided, followed by a holding pulse.

In a similar manner, FIGS. 2I and 2J show the operation of control 10 at a speed less that half-speed. As shown in FIG. 2J, four holding pulses are provided, followed by one stepping pulse. Flywheel 22 tends to insure that the average speed of motor 12 is that desired by its energization.

The various elements of rate control 10 shown schematically in FIG. 1 may be constructed from digital signal elements, the following specific circuitries being shown by way of example.

FIG. 3 shows circuitry which may be used for half-step generator 48 and its associated circuitry. Conductor 50 is connected to the clock input of a COS-MOS divide-by-N counter 100. Counter 100 may be that manufactured by RCA and sold under its device number CD 4018. The $\bar{Q}$ outputs of counter 100 are connected to AND gates 32, the inputs of which are shown as inverting. In some cases the connection made through inverters. Conductor 34 containing the output of duty cycle duty cycle divider 26 is also connected to the inputs of AND gates 32. The output of AND gates 32 are provided to output circuit 58.

Figure 4:
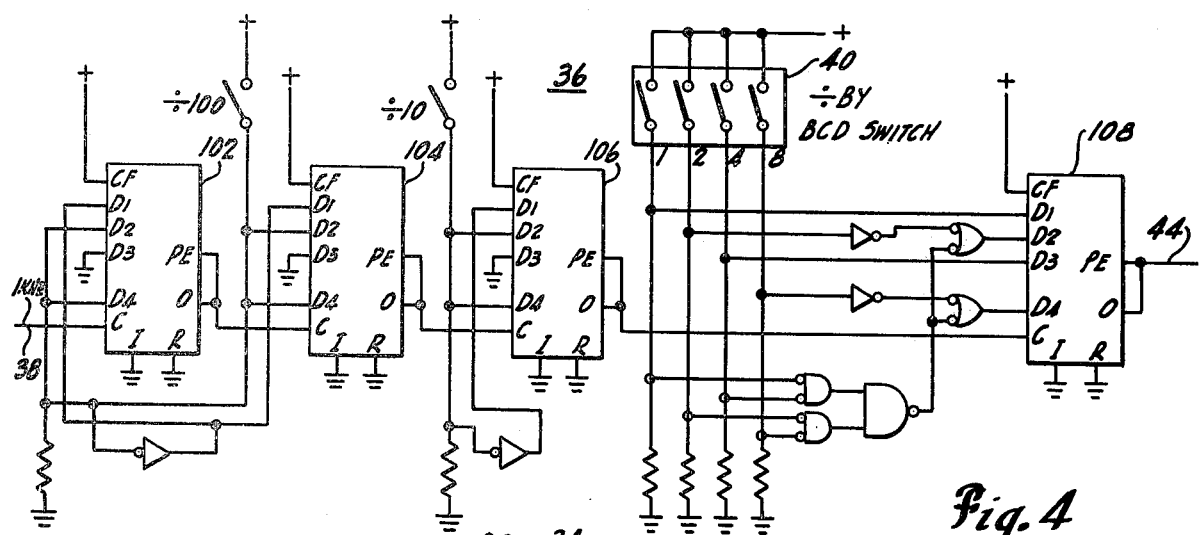
FIG. 4 is a schematic diagram of circuitry which may be used to form the divide-by-N-divider circuit of the rate control.

FIG. 4 shows typical circuitry which may be utilized for divide-by-N-divider 36. The output of duty cycle divider 26 in conductor 38 is connected to the first of three decade counters 102, 104, and 106 in a cascade configuration. Counters 102, 104, and 106 may typically be programmable divide by N four bit counters made and sold by Motorola under the designation MC 14526. Counters 102 and 104 count hundreds, and 106 counter counts tens, respectively. The cascaded counters are connected to a units counter 108, which may be a similar element, through switch 40 and associated circuitry. Switch 40 may comprise a binary coded decimal switch to enable the operator to control the dividing action of divide-by-N-divider 36 and the speed of motor 12.

Figure 5:
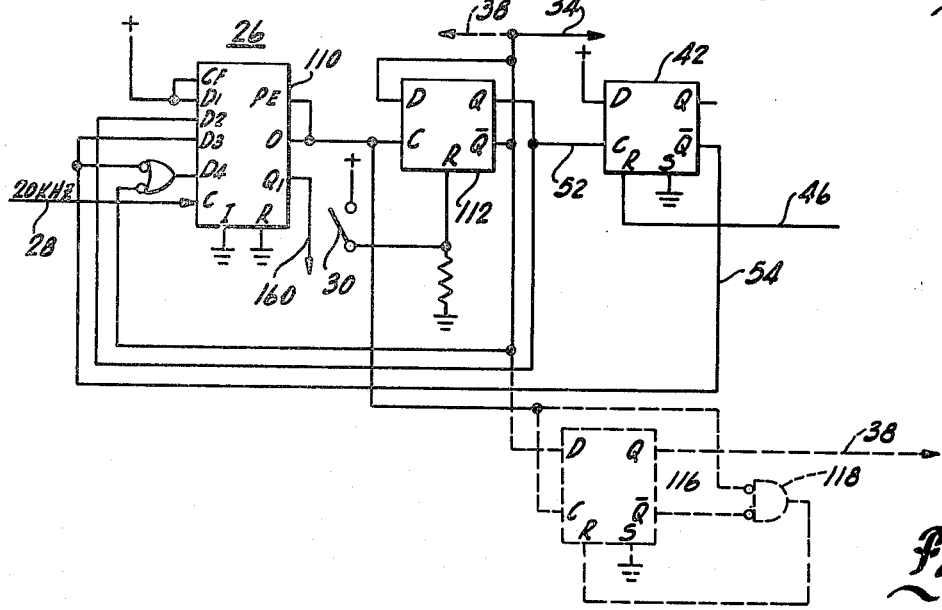
FIG. 5 is a schematic diagram of circuitry which may be used to form the duty cycle divider and duty cycle control circuits of the present invention.

FIG. 5 shows circuitry functioning as duty cycle divider 26 and duty cycle control 42. The 20 KHz output of clock 24 is provided in conductor 28 to the clock input of a programmable divide by 'N' four bit counter 110 which may b a Motorola MC 14526 device. Counter 110 has 4 data inputs, D1, D2, D3, and D4. These have a binary weighting of 1, 2, 4, and 8, respectively. As noted supra, duty cycle divider 26 forms the 75% duty cycle stepping pulses and the 55% duty cycle holding pulse by a counting function, as by counting 15 of the 20 clock pulses followed by 5 pulses received during each cycle for the stepping pulses and 11 of the clock pulses followed by 9 pulses for a holding pulse. It will be appreciated that the sum of 1, 2, 4, and 8 is 15. The sum of 1, 2, and 8 is 11. The sum of 1 and 8 is 9. The sum of 1 and 4 is 5. Thus, to form a stepping pulse, requiring a count of 15 followed by 5, the appropriate inputs are provided to each of the data inputs of counter 110. To form a holding pulse, requiring a count of 11, the signal at the data input having the binary weighting of 4 is removed so that 1, 2, and 8 are summed to count 11 followed by 9. The output of counter 110 is provided to flip-flop 112 which may be of the D type. The output of flip-flop 112 is returned to the data inputs of counter 110 so that in the absence of any signal from divide-by-N-divider 36, flip-flop 112 operates counter 110 to count 11 clock pulses followed by 9 pulses during each cycle to provide holding pulses in conductor 34. The pulses appear in conductor 34 from the $\bar{Q}$ output of flip-flop 112. Conductor 34 and conductor 38 to divide-by-N-divider 36 may be together as shown in FIG. 5.

The Q output of flip-flop 112 is also provided in conductor 52 to the clock input of a flip-flop comprising duty cycle control circuit 42. Flip-flop 42 is also of the D type. The signal from divide-by-N-divider 36 in conductor 46 is provided to the reset input of this flip-flop to alter the signals at the data inputs to counter 110 each time a signal appears in conductor 46 to cause counter 110 to count 15 pulses followed by 5 pulses and provide stepping width pulses in conductor 34. The Q output of flip-flop 42 is provided in conductor 52 to the input of duty cycle divider 26.

In certain applications, it may be desirable to operate the rate control so that the speed of motor 12 is proportional to the frequency of an external signal. For example, it may be desirable to operate motor 12 only during times when data to be recorded on chart 14 is transmitted and at a speed determined by the type of data being transmitted.

For this purpose, logic circuit 150 is inserted between divide-by-N-divider 36 and half-step generator 26, as shown in FIG. 26 and modification is made to the circuitry of FIG. 5. Logic circuit 150 receives the output signal of divide-by-N-divider 36 in conductor 44 as well as the external trigger signal in conductor 152 from external source 154.

Logic circuit 150 ascertains whether an external trigger signal has occurred since the last step energization was carried out in motor 12. If no external trigger has occurred, logic circuit 150 blocks the generation of a stepping pulse so that the energization of motor 12 remains in a holding mode. If an external trigger has occurred, a signal calling for a step is provided to half-step generator 48. Logic circuit 150 also insures that no trigger signals are missed, or counted twice, and that stepping occurs on the next possible step after the receipt of an external trigger signal.

This operation can be accomplished by the circuitry shown in FIG. 7 operating in the manner shown in FIG. 8. The external trigger signal in conductor 152 is applied to the clock input of flip-flop 156 which may be of the D type. The Q output of flip-flop 156 is applied to the data input of flip-flop 158. The clock input of flip-flop 158 is connected to a pulse signal which must span the output pulses from divide-by-N-divider in conductor 44 shown in FIGS. 2C, 2E, 2G, and 2I. It has been found that an output signal from the programmable divide-by-N four bit counter 110 used in duty cycle divider 26 is suitable for this purpose. This four bit counter includes four flip-flops used in the four bit counting operation. The Q1 output of this element is the output of the last stage of the counter. This signal rises approximately 50 microseconds before an output signal of the divide-by-N-divider 36 appears in conductor 44 and falls 50 microseconds after it. This signal is provided in conductor 160 shown in FIGS. 5, 7, and 6. FIG. 8A shows the pulse signal in conductor 160 to flip-flop 158 and FIG. 8B shows the output signal of divide-by-N counter 36 in conductor 44. FIG. 8 shows one energization period of motor 12. The frequency of the signal in conductor 160 is immaterial, it being only necessary in that it rise and fall "around" 44 and that is occur at least once each cycle. As shown by dotted lines in FIG. 8A, other pulses may occur without altering the operation of the circuitry, but the pulse spanning the output pulse of divide-by-N-divider 36 in conductor 44 must occur.

Flip-flops 156 and 158 may be considered a synchronous one shot multi-vibrator providing an output at the Q output of flip-flop 158 during each cycle if an external trigger pulse was received during any portion of the previous interval. The occurrence of an external trigger is shown in FIG. 8C and the output of flip-flop 158 is shown in FIG. 8D.

The Q output of flip-flop 158 is provided to the clock input of flip-flop 160 to cause a Q output signal to be provided to the data input of flip-flop 162 which rises on the output rise of flip-flop 158. The output of divide-by-N-divider 36 in conductor 44 shown in FIG. 8B is provided to the clock input of flip-flop 162. This will cause an output signal to appear in conductors 44a and 50 to half-step generator 48 when the output of the divide-by-N-divider 36 is applied to flip-flop 162, as shown in FIG. 8E.

If there is no signal at the Q output of flip-flop 160 and the data input of flip-flop 162, no signal will be provided to half-step generator 48 and duty cycle control 42 when an output from divide-by-N-divider 36 appears so that a holding pulse will be applied to motor 12. The Q output of flip-flop 162 is provided through AND gate 164 having inverting inputs to the reset input of flip-flop 162. The output of divide-by-N-divider 36 in conductor 44 is also provided to the input of AND gate 164 and to the reset input of flip-flop 160. This resets flip-flop 162 on the fall of the signal in conductor 44. Switch 166 is used to disable logic circuitry 150 in the event operation responsive to the signal in conductor 152 is not desired. A signal will then always appear at the Q output of flip-flop 160 and operation of the circuitry of FIG. 6 will be the same as that of FIG. 1.

In order to insure that the signal in conductor 106 and the signal in conductor 44 occur simultaneously, as by the spanning of the latter by the former, certain modifications may be made to duty cycle divider 26, as shown in FIG. 5.

The output of counter 110 and the $\overline{Q}$ output of flip-flop 112 are provided to the data and clock inputs of flip-flop 116, respectively. The $\overline{Q}$ output of flip-flop 116 and the output of counter 110 are provided to AND gate 118 having inverting inputs and the output connected to the reset input of flip-flop 116. The Q output of flip-flop 116 produces a signal in conductor 38 during each cycle of duty cycle divider 26. This signal is provided to the input of divide-by-N-divider 36 and forms the input signal to this circuitry which is used in its dividing operation to generate the output of signal in conductor 44.

Various modes of carrying out the invention are contemplated as being within the scope of the following claims particularly pointing out and distinctly claiming the subject matter which is regarded as the invention.

I claim:

1. A rate control suitable for use with a stepper motor having selectively energizable phase windings comprising:

pulse generating means providing a frequency signal at the output thereof having a predetermined cyclical motor energization interval, said pulse generating means being input signal responsive for providing during each interval, a stepping pulse occupying a preselected portion of said interval or a holding pulse occupying a lesser portion of said interval;

ratio means coupled to the output of said pulse generating means for generating a signal at the output of said ratio means indicative of a desired ratio of stepping pulses to holding pulses to be applied to the motor;

duty cycle control means coupled to said ratio means and responsive to the output signal thereof, said duty cycle control means being coupled to said pulse generating means and providing an input signal to said pulse generating means to cause said pulse generating to generate a pulse train output having a desired ratio of stepping pulses to holding pulses; and output circuitry having inputs connected to said pulse generating means and said ratio means, said output circuitry having outputs couplable to the phase windings of said motor and being operable by signals from said pulse generating means and said ratio means for sequentially energizing selected phase windings in accordance with said stepping pulses and for reenergizing selected phase windings in accordance with said holding pulses.

2. The stepper motor rate control of claim 1 wherein said pulse generating means is further defined as including a clock generator having an output providing a frequency characteristic signal and a duty cycle divider coupled to the output of said clock generator for altering the signal of said clock generator to provide a frequency signal having said predetermined cyclical motor energization interval and being input signal responsive for providing stepping pulses and holding pulses.

3. The stepper motor rate control according to claim 1 wherein said ratio means is further defined as means for effecting a division operation on said frequency signal of said pulse generating means to provide an output signal in each cycle in which a stepping pulse is desired at the output of said pulse generating means, and wherein said duty cycle control circuit is further defined as providing an input signal to said pulse generating means to cause said pulse generating means to generate a stepping pulse responsive to an output signal from said ratio means.

4. The stepper motor rate control according to claim 3 wherein said duty cycle control is further defined as coupled to the output of said pulse generating means for causing said duty cycle control to provide an input signal to said pulse generating means to generate a holding pulse responsive to the generation of a pulse by said pulse generating means in the absence of an output signal from said ratio means.

5. The stepper motor rate control according to claim 2 wherein said clock generator provides a pulse train output signal having a higher frequency than the frequency signal of said duty cycle divider so that a plurality of signal pulses occur in said clock generator signal in each cyclical interval of said duty cycle divider and wherein said duty cycle divider includes counter means operable by said duty cycle control means input signal for counting preselected numbers of said signal pulses for determining the portions of said cyclical intervals occupied by said stepping and holding pulses.

6. The stepper motor rate control circuit according to claim 3 wherein said output circuit includes coincident input signal logic means responsive to the coincidental presence of a stepping pulse and a signal from said ratio means for sequentially energizing selected phase windings and responsive to the presence of a holding pulse for reenergizing selected pulse windings.

7. The stepper motor rate control according to claim 1 including logic means interposed at the output of said ratio means for controlling the provision of the ratio means output signal to said duty cycle control and output circuitry in accordance with an external input signal to said logic means for controlling the speed of said motor in accordance with said external signal.

8. The stepper motor rate control according to claim 7 wherein said logic means includes means for sampling for the presence of the external input signal during each cyclical interval for controlling the provision of said ratio means output signal.

9. The stepper motor rate control according to claim 8 wherein said ratio means generates a signal during each cyclical interval and wherein said logic means is further defined as means for sampling for the presence of the external input signal prior to the generation of the divider means signal.

* * * * *